(12) United States Patent
Ritter et al.

(10) Patent No.: US 6,829,593 B1
(45) Date of Patent: Dec. 7, 2004

(54) METHOD AND SYSTEM TO PROVIDE OBJECTS, ESPECIALLY DOCUMENTS, MULTIMEDIA OBJECTS, SOFTWARE APPLICATIONS AND/OR PROCESSES TO USERS OF A TELECOMMUNICATIONS NETWORK

(75) Inventors: Rudolf Ritter, Zollikofen (CH); Claudio Cabano, Bern (CH); Eric Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/477,803

(22) Filed: Jan. 5, 2000

Related U.S. Application Data

(63) Continuation-in-part of application No. PCT/CH98/00562, filed on Dec. 29, 1998.

(51) Int. Cl.[7] .............................................. G06F 17/00
(52) U.S. Cl. ........................... 705/51; 705/1; 455/411
(58) Field of Search ................................ 705/1, 50, 51, 705/52, 53, 72; 463/40, 16, 20; 455/403, 410, 411, 412, 413, 414, 415, 416, 417, 517, 519; 375/220

(56) References Cited

U.S. PATENT DOCUMENTS 5,907,831 A * 5/1999 Lotvin et al.
6,006,084 A * 12/1999 Miller et al.
6,139,177 A * 10/2000 Venkatraman et al.
6,169,976 B1 * 1/2001 Colosso

FOREIGN PATENT DOCUMENTS

WO    97/31491    8/1997

OTHER PUBLICATIONS

Mitchell, Richard; GSA: The Feds' Smart-Card Point Man; Oct. 1997; Card Technology, p30+; dialog copy 5 pages.*
Low, C: "The Internet Telephony Red Herring," HP Laboratories Technical Report, May 15, 1996, pp. 1–15, XP002043901.

* cited by examiner

*Primary Examiner*—Thomas A. Dixon
(74) *Attorney, Agent, or Firm*—Pearne & Gordon LLP

(57) ABSTRACT

Method with which a first user of a mobile telecommunications network, in which users are identified with a chip card by the provider of the telecommunications network, can provide objects to other users of the telecommunications network, with the following steps:

reserving by the first user of a memory area in an accessible database in said telecommunications network, in which at least a number of users can store objects, for example documents and programs, filing by the first user of objects in said memory area, allocation by the first user of access authorizations for said objects, sending by a second user of a query to said database, verification of the access authorization of the second user through the database administration system, by using the second user's identity stored in his said personal identification module for his identification in the database administration system, if his access authorization allows it, sending of a reply from the database to the second user.

53 Claims, 1 Drawing Sheet

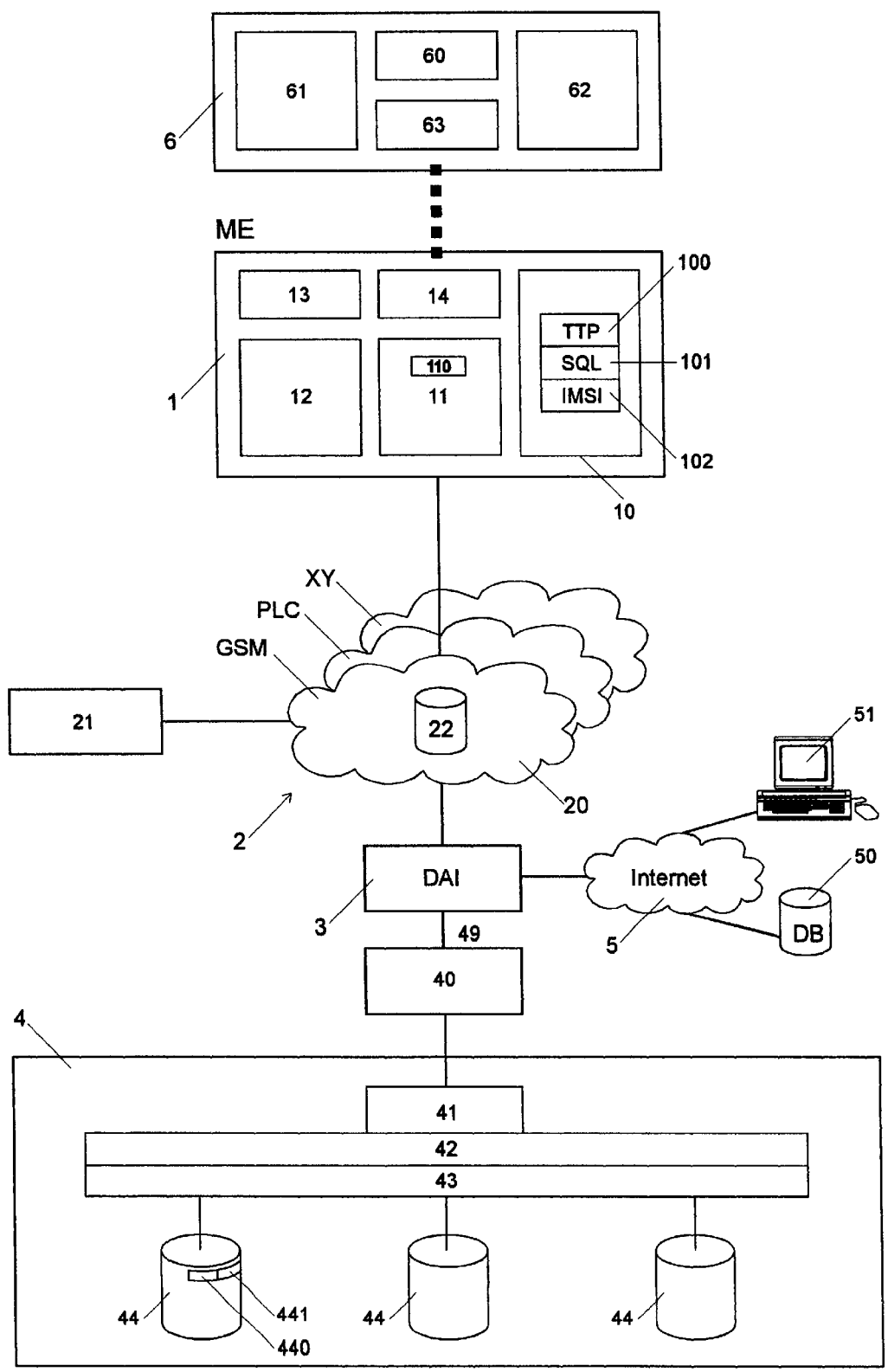
Fig.

METHOD AND SYSTEM TO PROVIDE OBJECTS, ESPECIALLY DOCUMENTS, MULTIMEDIA OBJECTS, SOFTWARE APPLICATIONS AND/OR PROCESSES TO USERS OF A TELECOMMUNICATIONS NETWORK

This is a Continuation-in-Part of: International Appln. No. PCT/CH98/00562 filed Dec. 29, 1998 which designated the U.S.

This application is a continuation of application PCT/CH98/00562 filed on Dec. 29, 1998, the contents of which are hereby incorporated by reference.

FIELD OF THE INVENTION

The present invention concerns a method and a system to provide objects, especially documents, multimedia objects, software applications and/or processes, to users of a telecommunications network. The present invention specifically concerns a method to provide objects to nomad users of a network in which the users identify themselves with an identification module, for example with a personal chip card, especially a System Identification Module, (SIM) card.

RELATED ART

Telecommunications systems to provide data and objects to other users are already known. In these systems, also known as pull systems, various providers can file various objects and data at various nodes of a telecommunications system where they can be sought at the users' initiative. The internet is a well-known example of such a system.

Users are usually connected to an Internet Service Provider (ISP) via the public telephone network. Generally, the provider of the telephone network does not identify the users personally; merely the used terminals are identified, regardless of the user, for billing of the telecommunication charges. The ISP generally requests a password for identification purposes but a large number of ISPs do not require an absolutely reliable identification. Anonymous and unreliably identified users can therefore also use the Internet. Furthermore, the identification of users is, as a rule, not passed on by the ISP to further information providers.

As the identification of the internet users is not reliable, it cannot be used to check the authorization of said users to access objects of a confidential nature such as private or corporate documents. Providers on the internet of confidential objects and documents, or of objects and documents that are not free of charge, as a rule require the users to identify themselves with a password before being able to access protected storage areas. In this case the users are directly identified by the provider and receive a first bill from the telephone network provider for the connection to the ISP, a second bill from the ISP for access to the internet and a third bill from the provider of objects or documents for access to the sought objects. This billing arrangement is rather inconvenient for the user.

Also known are mobile radio networks and other networks in which the users, often called subscribers, identify themselves with an identification module, often called Subscriber Identification Module, (SIM) is card in the form of a chip card. In these networks, the identification of the users by the network provider is very reliable and independent of the used terminal. The Global System for Mobile, (GSM) mobile radio network is an example of such a network.

The GSM network was developed primarily for voice communication between mobile users. The interface between GSM networks and other networks, for example the internet, is however also known and was among others described in patent application EP-A10841788 among others. Thus, subscribers to a mobile radio network can also access data filed by another provider at a host in the internet and receive these data for example on mobile terminals, for example mobile telephones or palmtops. A protocol for data transfer and for applications within a mobile radio network was specified among others in the Wireless Application Protocol, (WAP) forum.

Subscribers to mobile radio networks who access the internet with their mobile terminals in said fashion are identified only within the mobile radio network. This secure identification method by means of the users' chip card cannot however be used by object providers in the internet to check access authorization of said users to protected objects. Furthermore, these providers cannot easily bill the access to users.

It is therefore an aim of this invention to propose a method and a system to provide objects to users of a mobile telecommunications network, wherein users identify themselves with an identification module and wherein identification is also used by various providers to verify access authorization to various objects.

Another aim of the invention is to propose a method and a system that can also be utilized by nomad users who are not linked to a fixed node in the telecommunications network. Nomad users are defined in this text as users who can log in from various nodes in a telecommunications network and whose identification is not dependent on their geographical location. As an example of nomad users one could cite subscribers in a digital mobile radio network, users of a fixed and PLC (Power Line Communication) network who let themselves be identified personally and regardless of the used terminal through an identification module in the network.

Another aim of the invention is to propose a method and a system wherein the providers of objects let themselves be identified through an identification module. Thus they can be identified reliably in order to enable them to administer the access authorization to filed data themselves.

The access authorization granted by the providers can be nominal or issued to the holder of a token. In the former case only users whose names or identification are on a list drawn up by the provider may access the objects in question. In the latter case, the users must obtain a transferable token to access these objects. These tokens contain for example an electronic key for the documents in question and can be sold or traded. Thus the copyright to a document, for example to a text or a multimedia document, may also be sold.

BRIEF DESCRIPTION OF THE DRAWINGS

The present invention will be better understood from reading the description given by way of example and illustrated by the sole FIGURE representing a block diagram that shows the most important components of a telecommunications system according to an embodiment of the invention.

The FIGURE represents in a schematic way a terminal 1 that can be used in a telecommunications network 2. The terminal can be for example a digital mobile radio apparatus, for example a mobile radio telephone or a laptop/palmtop that can be used for example in a GSM network 20 or a Universal Mobile Telecommunication System, (UMTS) network. The terminal 1 can however also be a Power Line Communication, (PLC) terminal that can be linked to other terminals over a current network 2. In one variation terminal 1 is comprised of a normal terminal in a fixed network, for example a telephone, a fax machine, a television, radio or DAB receiver or a PC with modem that is equipped with a chip-card reader.

The terminal in this example comprises an identification module 10 (to be explained below), data processing means 11 (for example a processor with corresponding storage means), input means 12, for example a keyboard, a microphone, an input pen and/or a mouse, as well as output means 13, for example a Liquid Crystal Display, (LCD) and/or a loudspeaker. Preferably the terminal 1 additionally includes a contact free interface 14, which enables it to communicate with other apparatus 6 in the same room. The contact free interface 14 can be for example an infrared interface, for example according to the IrdA protocol, or preferably a radio interface according to the Bluetooth specification. The other unit 6 can for example serve to extend the input, replay or storage possibilities of the usually portable terminal 1. The apparatus 6 can be for example a PC that offers more storage and processing means or a display unit, for example a monitor, a projector, a television set or a printer, or else a receiver, for example a PC with internet connection, a Digital Audio Broadcasting, (DAB) receiver etc. The transfer of data between terminal 1 and the external unit 6 is preferably bi-dimensional.

The processing means 11 preferably consist of hardware components as well as software modules, for example a WAP (Wireless Application Protocol) module to send and receive data according to the WAP protocol.

Other components in terminal 1 could also include for example a Global Positioning System, (GPS) receiver (not shown) or a similar location determining device through which the geographical location of the terminal can be established.

The user of terminal 1 is identified in the network through an identification module 10, for example with a chip card 10 inserted in the terminal. Such identification cards are already common among others in GSM mobile radio telephones and are also used in PAY-TV control units and in various computer networks. The identification card 10 comprises preferably a processor (not shown), for example a microprocessor with integrated memory as well as contact surfaces (not shown) to link the card with the terminal.

An identity indication 102 that clearly identifies the user in the telecommunications network 10 is stored in a protected part of the card 10. Such information is known for example in GSM networks as International Mode Subscriber Identity, (IMSI). As described below, this identification according to the invention is also used for the identification of the users in database system 4.

In one form of the invention, an applet, for example a JAVA applet in a JAVA compatible chip card, containing for example GSM functions, can be used as a means of identification. In this way, the method according to the invention can also be carried out with a JAVA card.

The identification card 10 also comprises preferably encryption and signature means 100 for signing and encoding messages as well as checking the authenticity of messages through network 2. For this purpose preferably the TTP (Trusted Third Party) process is used, which is described in patent application WO98/37524 in the name of the applicant. Thus can confidentiality, authenticity, the non-deniability of the origin, the integrity of the data as well as the authenticity of the sender in question be ensured.

A SQL client 101 is furthermore preferably integrated in card 10 as a software application. The company Centura already offers SQL clients integrated in a card. Thus a call according to the SQL protocol can be made between the SQL client on the card and an external SQL database server in the telecommunications network, as will be explained further below. Other database query languages can also be used instead of or in addition to SQL in the frame of the invention.

Card 10 preferably supports java and the SQL client is preferably a SQL JDBC (SQL Java DBC).

Terminal 1 with the identification module 10 can log into a nomad network 2, for example in a mobile radio network 20, to communicate with other terminals in this network. Network 2 comprises preferably a Home Location Register, (HLR) 22 in which user specific information, among others the billing address as well as the present location of the terminal in the network, is stored. When the user switches on his terminal or connects it to the network, he is identified by HLR 22 through user identity indication 102. The connections that the user makes through the network 2 or use of other VAS (Value Added Service) in the network are then billed by a Billing Server 21, either by charging an account (not shown) in card 10 (Prepaid) or by later billing the user with a monthly bill (Postpaid).

Preferably the user can also log in with the terminal into networks run by other network providers. Known roaming methods are used for this purpose. Preferably the user can also log in with his identification card 10 into another type of network, for example with the same card and suitable terminals either in a GSM network with 900, 1800 or 1900 MHz or also in a Power Line Communication, (PLC) network. The user is, however, always billed by the billing center of his home network.

Through the appropriate interface DIA (Direct Internet Access) 3 the network 2 is linked to the internet 5. This interface allows the bi-directional transmission of messages between the nomad network 2 and the internet. In this manner, the user who is logged in network 2 can, with his terminal 10, also prepare, send and receive emails or download data from web server 51 or database 50 in the internet. For that purpose the WAP (Wireless Application Protocol) is preferably used.

In internet 5 the nomad user remains anonymous or is identified at most by an easily forged email address. Access to protected or expensive applications or objects in the internet is therefore only possible through additional end-to-end encryption methods. The billing of these applications is in this case generally done by the service provider 50, 51, for example through the querying users giving their credit card number. The user is billed individually for each required service, which is rather awkward especially if many small amounts from various providers are being billed. Furthermore, in most cases the users and the object providers do not know each other so that the latter are hardly in any position to check the users' solvency.

According to the invention, the network 2 is also linked to a database system 4 that is being administrated for example by the provider of network 2 and/or one or several organizations associated with the provider. The link between network 2 and database system 4 is effected preferably by the mentioned Direct Internet Access 3, (DIA3) and a link 49, for example a TCP/IP, ATM or X Digital Subscriber Line, (XDSL) link and an optional firewall device 40 The TCP/IP link and the firewall device are preferably administrated by the provider of network 2 and/or of system 4; the connection is therefore not established via the public internet 5.

The database system consists of one or preferably several distributed databases 44 (Hosts) that can be located in various geographical locations. A conventional database administrator 42 operates the whole database, among others the filing of the objects (Document Hosting) and if necessary also the replication rights. The database administrator can include for example a conventional SQL server 420, preferably a JAVA DBC server. A user administrator 43 consisting preferably of a software module, operates the rights of the various users.

In order for a user to provide objects to other users of the telecommunications network, the user must first reserve a domain 440 in database system 4. To this effect he has to log into network 2 and send a message to the database system, for example through the WAP protocol and/or a SQL protocol. According to the invention the user is identified by the user administrator 43 through the transmitted identity indication 102 from the identification module 10. In the case of a GSM network 20, the IMSI or any other identification contained in an applet stored in the SIM card 10 is communicated through network 2 and the safe channel 3, 49, 40 to the database system. The user can then store data and objects in this reserved domain 440.

Reserved memory areas are preferably rented to the user by the database system. The amount billed depends for example on the reserved or actually used memory area and of the length of usage. Other parameters, for example a certain required quality of service, can also affect the amount billed. Preferably the details of the billed amounts are established by the user administrator 43, embedded in a message and assigned through link 49 and the home network of the user to the billing center 21. To this end methods can for example be used that are already in use for the transmission of Call Detail Records, (CDR) in a roaming process between two mobile radio networks. Applets, for example JAVA applets, can also be used to allow for a billing in different networks 2. The charge for use of the database is then simply billed to the providing user with the normal bill for use of the network or is billed separately or is debited to an account in his card.

The providing user can allot various access authorizations 441 to the stored objects. For example, certain objects can be private, in which case only he has got access to these objects. In this private area he can store for example objects and documents for which there is no space on his identification card 10. He can also use this area of the card for example to backup certain parts of his card, for example to copy the stored telephone numbers and user specific parameters in database system 4. He can store objects in said private area as well as his card or his terminal 1.

Other objects may for example only be accessible for certain other users (Closed User Group). These objects can encompass for example internal company documents and applications. The authorized users can either be mentioned by name—in this case only the users listed by the provider have access to said objects—or they can be holder of certain transmittable tokens—in which case only the users who have first acquired the appropriate token can access said objects once. The tokens can include for example an electronic key that is necessary to read the objects. After a successful access to the relevant objects, the corresponding tokens is erased. In this way objects, for example text documents, computer programs or multimedia objects, can be sold.

Other objects can of course also be made public and generally accessible; in this case, every user without any specific authorization can access said objects.

A user wanting to access objects stored in database system 4 first has to connect to this system. For this purpose he uses a terminal 1 with an identification module 10, preferably a WAP supporting terminal and/or module. He is identified in network 2 and database 4 through his identity indication stored in his identification module. Preferably his identity is also checked by a TTP server 41 that checks his electronic signature generated by the encryption system 100. This electronic signature can be required either for every use or only for access to certain objects, for example only if the objects provider demands it. A password can also be required by the user administrator, by a provider or by a suitable program in his identification module for example to access certain objects or address areas of the database.

The querying user can then send an query to database system 4. The query in the easiest case can be only the address of a sought document in the database system, or it may be a more complex query, for example a SQL query generated by the SQL client 101, that is understood and interpreted by the SWL server 420. The SQL server then determines the answer to the query, which can for example consist of a list with one or several objects 440 in the database system, and verifies whether the already identified user is allowed to access these objects. To this end, it verifies the authorizations allotted to these objects by the provider.

If the querying user's access authorization is granted, the database system sends a reply to him, said reply already containing for example a copy of the sought object. The required object can then be seen, saved or listened to on the terminal 1 of the user or it can be transferred via an infrared or Bluetooth interface to another unit 6. If the user has no access to these objects, he receives preferably a message or is asked to enter another identification, for example in the form of a password. Preferably the number of tries is limited to n, for example n=3; after n unsuccessful tries, access is then denied.

The providers can preferably allocate an expiration date for their objects. In this case the database system allows access to these objects only up to the indicated date, which can be useful for example to distribute tariffs or other time dependent information. In one form of the invention it is also possible to provide a time window indicating the beginning and end of the period of validity.

As mentioned above, the providers can store for example documents or objects in any storage format whatsoever, for example text documents, still or moving pictures, sound sequences etc. They can also, however, store applications or computer programs that can be downloaded and run by other users; the providers can either allow a single use or an unlimited number of uses. Preferably users can also store objects as well as process applications that can be implemented in the database system. For example, search engines be stored that allow users to search for other objects in the database system 4 or to carry out other services. Applications may also be stored in the database system, for example personal agents, to which various parameters can be applied by querying users to implement certain functions.

The user administrator 43 preferably examines whether the querying user's terminal is technically able to access the sought objects. It would for example be purposeless to send a document consisting of picture data only to a user whose terminal does not allow the display of pictures. For this purpose the JINI protocol known for other applications in GSM networks is preferably used to ensure technical compatibility between the user's terminal and the sought object.

The directory hierarchy in database 44 is not essential to the invention but it has to allow for fast searches for stored objects. Each stored object has preferably its own address;

certain parts of the address are allotted by the database administrator whereas other parts are defined by the providing users. Search engines that are supplied by the database administrator 42 and/or the user help users to find objects by indexing or cataloguing other objects. Users can preferably also save as bookmarks the address of important documents or other standard queries in their identification modules.

A user profile is preferably stored in the database system and operated by the user administrator. User specific details are stored in the user profile, for example the identification, the preferred language, the preferred terminal etc., or also the preferred bookmarks. Preferably the user profile also contains a required Quality of Service (QoS). In that way, various users can have access of differing quality to the objects, which may be billed differently. The QoS can indicate for example the objects' bandwidth, reaction time, availability, preferred transmission channel (for example Short Message System, (SMS), Unstructured Supplementary Service Data, (USSD) or speech/data channel in the case of a GSM mobile radio network) etc.

Also, users who store and provide objects in database system 4 allocate various Quality of Service values to said objects. For example, providers can indicate that every user with the maximal bandwidth can access certain objects. Providers can also request, for example, that their objects be stored in better, for example faster or more secure, servers if the database system is spread over several servers.

A fee can be charged for access to the sought objects in database system 4. It has already been mentioned that certain objects can only be accessed when the querying user has first acquired a token, and said tokens can also be sold or traded. The administrator of the database system 4 can also request a fee which can then be directly billed to the user by the above mentioned mechanism through account center 21. The charged fee depends on various parameters, for example on the size of the object (in kilobytes), on the type of the object, on the required quality of service, on the complexity of the query etc. Furthermore, the administrator of the database system as well as the provider of network 2 (if they are two separate entities) can demand a fee for the transfer of the object to the user's terminal. The fee requested by the account center 21 can either be deducted from a prepaid account in the user's identification module or it can be billed with the user's bill for use of the telecommunications network.

The provider can, with the same mechanism, also charge a fee for access to the objects he provides. The requested fee is at the earliest allocated when certain objects or classes of objects are stored. If a user later accesses these objects the fee is determined by the database administrator, then communicated to the account center 21, billed to the querying user together with a fee from the database system administrator and credited to the provider.

Users can preferably access database system 4 from the internet, either to reserve memory areas in which to store objects, or to access stored objects. In this case a point-to-point encryption and signing method between the users 51 from the internet and the database system 4 is preferably used so as to guarantee reliable identification of the users from the internet. The TTP method for example can be used to this end. The users from the internet cannot however access costly objects in the database system 4, or can only do so with another billing mechanism, for example a credit card.

What is claimed is:

1. Method with which a first nomad user of a telecommunications network (2), in which users can provide objects to other users of the telecommunications network, the method comprising the steps: of
   identifying a user by using a personal identification module;
   reserving by the first user of a memory area (440) in an accessible database system (4) in said telecommunications network, in which at least a number of users can store objects,
   filing by the first user of objects in said memory area (440), allocation by the first user of access authorizations (441) for said objects,
   sending by a second user of a query to said database system (4),
   verification of the access authorization of the second user through the database system (4), by using the second user's identity (102) stored in his said personal identification module (10) for his identification in the database system (4),
   if his access authorization allows it, sending of a reply from the database system (4) to the second user,
   wherein said database system (4) is connected to said telecommunications network (2) via a TCP/IP link,
   wherein the queries from users and the replies from the database system (4) are converted in a DIA interface (3) between the telecommunications network (2) and the TCP/IP link,
   wherein at least some messages between said user and the database system (4) are signed electronically.

2. Method according to claim 1, wherein the integrity of at least one of certain transmitted queries and objects are verified with said electronic key.

3. Method with which a first nomad user of a telecommunications network (2), in which users can provide objects to other users of the telecommunications network, the method comprising the steps: of
   identifying a user by using a personal identification module;
   reserving by the first user of a memory area (440) in an accessible database system (4) in said telecommunications network, in which at least a number of users can store objects,
   filing by the first user of objects in said memory area (440), allocation by the first user of access authorizations (441) for said objects,
   sending by a second user of a query to said database system (4),
   verification of the access authorization of the second user through the database system (4), by using the second user's identity (102) stored in his said personal identification module (10) for his identification in the database system (4),
   if his access authorization allows it, sending of a reply from the database system (4) to the second user,
   wherein a fee is billed at the analysis of at least certain queries, a message with at least one indication of this amount being prepared and sent to a billing center (21) in said telecommunications network (2), the billing center (21) also billing the users for use of the telecommunications network (2), and wherein said billing center (21) debits the user of that amount.

4. Method according to claim 3, wherein at least certain said amounts are automatically deducted from a prepaid amount of money in the user's identification module.

5. Method according to one of claim 3 or 4, wherein at least certain said amounts are billed to the second users with their bill for use of the telecommunications network.

6. Method with which a first nomad user of a telecommunications network (2), in which users can provide objects to other users of the telecommunications network, the method comprising the steps: of identifying a user by using a personal identification module regardless of the user's geographic location and also regardless of any network being accessed;

reserving by the first user of a memory area (440) in an accessible database system (4) in said telecommunications network, in which at least a number of users can store objects, filing by the first user of objects in said memory area (440), allocation by the first user of access authorizations (441) for said objects, sending by a second user of a query to said database system (4), verification of the access authorization of the second user through the database system (4), by using the second user's identity (102) stored in his said personal identification module (10) for his identification in the database system (4), if his access authorization allows it, sending of a reply from the database system (4) to the second user.

7. Method according to claim 6, wherein said database system (4) is distributed in various hosts (44) accessible from said telecommunications network (2).

8. Method according to claim 6, wherein said telecommunications network (2) is a digital mobile radio network (20).

9. Method according to claim 6, wherein said telecommunications network (2) is a digital Power Line Communication network.

10. Method according to claim 6, wherein said telecommunications network (2) is a digital telephone network in which users identify themselves regardless of terminal (1) with a chip card (10).

11. Method according to claim 6, wherein said database system (4) is connected to said telecommunications network (2) via a TCP/IP link.

12. Method according to claim 11, wherein the queries from users and the replies from the database system (4) are converted in a DIA interface (3) between the telecommunications network (2) and the TCP/IP link.

13. Method according to claim 6, wherein the users do not request access authorization for the access to certain public objects.

14. Method according to claim 6, wherein the users allot an access authorization only to a limited number of predefined users (CUG Closed User Group).

15. Method according to claim 14, wherein users allot an access authorization for certain objects only to themselves.

16. Method according to claim 6, wherein users allot an access authorization for certain objects only to holders of a certain token.

17. Method according to claim 16, wherein said token contains an electronic key.

18. Method according to one of the claim 16 or 17, wherein said token is erased after access to the objects in question.

19. Method according to claim 18, wherein said token is only erased after the database system (4) receives a confirmation from the querying user that the latter has received completely the objects in question.

20. Method according to claim 6, wherein the users additionally identify themselves to the database system (4) with a password.

21. Method according to claim 20, wherein the password is requested by the user administrator.

22. Method according to claim 20, wherein the password is requested by an application in the user's identification module (10).

23. Method according to one of claims 20–22, wherein users additionally identify themselves to the database system (4) with an electronic key stored in the identification module (10).

24. Method according to claim 6, wherein said identity (102) is an IMSI.

25. Method according to one of claim 6 or 24, wherein said identity (102) is contained in an applet in the identification module (10).

26. Method according to claim 17, wherein said electronic key is supplied by a Trusted Third Party (TTP).

27. Method according to claim 6, wherein a user profile of at least certain users is stored in said database system (4).

28. Method according to claim 27, wherein said user profiles contain the users' priority parameters for use of the database system (4).

29. Method according to one of claim 27 or 28, wherein said user profiles indicate as a bookmark the users' preferred queries.

30. Method according to claim 6, wherein the providing users identify themselves through their identification module (10) to reserve a memory area (440).

31. Method according to claim 30, wherein said reserved memory areas (440) can be rented to providing users.

32. Method according to claim 31, wherein a billed fee for the rented memory area (440) depends on the amount of data and on the storage time.

33. Method according to claim 6, wherein users reserve memory area through the internet and store objects in these memory areas.

34. Method according to claim 10, wherein the WAP protocol is used for the transfer of data between the terminal (1) and the database system (4) and for a menu structure.

35. Method according to claim 6, wherein at some portion of said objects are documents.

36. Method according to claim 6, wherein at least some portion of said objects are multimedia objects.

37. Method according to claim 6, wherein at least some portion of said objects are applications that can be run by second users.

38. Method according to claim 6, wherein said first users can allocate an expiration date for the stored objects after which these objects can no longer be consulted.

39. Method according to, claim 6 wherein said first users can allocate a time window for the stored objects during which these objects can be consulted.

40. Method according to claim 6, wherein at least certain said first users can allocate a Quality of Service (QoS) to the stored objects.

41. Method according to claim 6, wherein at least certain said second users require a Quality of Service (QoS) in their user profile which indicates with what quality these users can receive objects.

42. Method according to one of the claim 40 or 41, wherein said Quality of Service comprises a minimal bandwidth for the transmission of objects.

43. Method according to one of the claims 40 to 41, wherein said Quality of Service comprises a maximal object transfer time.

44. Method according to one of the claims 40 to 41, wherein said Quality of Service comprises a preferred transmission channel.

45. Method according claim 6, wherein said objects are stored in one directory hierarchy defined at least partially by the database administrator (43).

46. Method according to claim 45, wherein at least certain objects are search engines that can perform at least one of index and catalogue other objects in order to be able to search for them.

47. Method according to claim 6, wherein the user profile contains information on the terminal (10) used by the second user.

48. Method according to claim 6, wherein at least certain sought objects are transferred via a Bluetooth interface (14, 63) to another unit (6).

49. Method according to claim 23, wherein said electronic key is supplied by a Trusted Third Party (TTP).

50. Method according to claim 42, wherein said Quality of Service comprises a maximal object transfer time.

51. Method according to claim 50, wherein said Quality of Service comprises a preferred transmission channel.

52. Method according to claim 42, wherein said Quality of Service comprises a preferred transmission channel.

53. Method according to claim 43, wherein said Quality of Service comprises a preferred transmission channel.

* * * * *